US008458578B2

United States Patent
Park et al.

(10) Patent No.: US 8,458,578 B2
(45) Date of Patent: Jun. 4, 2013

(54) APPARATUS FOR GENERATING SOFT DECISION VALUES USING AN ANALOG-TO-DIGITAL CONVERTER AND METHOD THEREOF

(75) Inventors: Sung Chung Park, Daejeon (KR); Jun Jin Kong, Yongin-si (KR); Seung Jae Lee, Hwaseong-si (KR); Seung-Hwan Song, Incheon (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 1617 days.

(21) Appl. No.: 11/978,569

(22) Filed: Oct. 30, 2007

(65) Prior Publication Data

US 2008/0288849 A1  Nov. 20, 2008

(30) Foreign Application Priority Data

May 17, 2007  (KR) ........................ 10-2007-0048130

(51) Int. Cl.
  *H03M 13/03* (2006.01)
  *H03M 13/00* (2006.01)
(52) U.S. Cl.
  USPC ............................ 714/794; 714/780; 714/796
(58) Field of Classification Search
  None
  See application file for complete search history.

(56) References Cited

U.S. PATENT DOCUMENTS

| 5,185,747 A * | 2/1993 | Farahati ........................ 714/795 |
| 5,414,738 A * | 5/1995 | Bienz ............................ 375/341 |
| 6,115,435 A | 9/2000 | Harada et al. |
| 6,163,517 A * | 12/2000 | Kim et al. .................. 369/59.21 |
| 6,487,255 B1 * | 11/2002 | Arslan et al. .................. 375/262 |
| 6,594,318 B1 * | 7/2003 | Sindhushayana ............. 375/262 |
| 7,613,975 B2 * | 11/2009 | Jibry et al. ..................... 714/746 |
| 7,657,822 B2 * | 2/2010 | Shen et al. ..................... 714/776 |

(Continued)

FOREIGN PATENT DOCUMENTS

| KR | 1020020038237 A | 5/2002 |
| KR | 10-2003-0017886 | 3/2003 |
| KR | 1020050079986 A | 8/2005 |
| KR | 100660056 B1 | 12/2006 |

OTHER PUBLICATIONS

Yu-Jhih Wu; Chau, P.M.; , "An adaptive soft-decision quantizer for digital communications with convolutional coding on a Rayleigh fading channel," Neural Networks, 1993. IJCNN '93-Nagoya. Proceedings of 1993 International Joint Conference on , vol. 1, No., pp. 447-450 vol. 1, Oct. 25-29, 1993 (abstract).*

(Continued)

*Primary Examiner* — Ajay Bhatia
*Assistant Examiner* — Daniel McMahon
(74) *Attorney, Agent, or Firm* — Harness, Dickey & Pierce, P.L.C.

(57) ABSTRACT

According to an example embodiment, a method of generating a soft decision value using an Analog-to-Digital Converter (ADC) having a given resolution may include receiving metric values calculated based on levels of a transmission signal and output levels of the ADC. Metric values corresponding to a level of a received signal may be selected from among the received metric values. A first maximum metric value may be detected from among the selected metric values when a transmission bit is a first level, and a second maximum metric value may be detected from among the selected metric values when the transmission bit is a second level. The soft decision value may be generated based on a difference between the first maximum metric value and the second maximum metric value.

10 Claims, 7 Drawing Sheets

U.S. PATENT DOCUMENTS

| | | | | |
|---|---|---|---|---|
| 7,924,753 B2 * | 4/2011 | Attar et al. | | 370/310 |
| 8,121,177 B2 * | 2/2012 | Narayan et al. | | 375/148 |
| 2003/0112900 A1 | 6/2003 | Ha et al. | | |
| 2005/0246616 A1 * | 11/2005 | Choi et al. | | 714/801 |
| 2006/0170581 A1 * | 8/2006 | Lin | | 341/155 |
| 2008/0320064 A1 * | 12/2008 | Park et al. | | 708/100 |

OTHER PUBLICATIONS

International Search Report dated Mar. 24, 2008 for corresponding International Application No. PCT/KR2008/000041.

\* cited by examiner

APPARATUS FOR GENERATING SOFT DECISION VALUES USING AN ANALOG-TO-DIGITAL CONVERTER AND METHOD THEREOF

PRIORITY STATEMENT

This application claims priority under 35 U.S.C. §119 to Korean Patent Application No. 2007-0048130, filed on May 17, 2007, in the Korean Intellectual Property Office, the entire contents of which are incorporated herein by reference.

BACKGROUND

Soft decision values for Error Control Codes or Error Correction Code (ECC) may be generated based on Log Likelihood Ratios (LLR). When a relatively high-resolution Analog-to-Digital Converter (ADC) is used, the level of a received signal outputted from the relatively high-resolution ADC may be similar to the level of an analog signal actually received. When a metric value is assumed by using a Gaussian Probability Distribution Function (PDF), the metric value may be calculated according to Equation 1:

$$a(x, y) = \log p(y \mid x) \quad \text{[Equation 1]}$$
$$p(y = y_n \mid x = x_m) = K_m \exp\left(-\frac{(y_n - x_m)^2}{\sigma_m^2}\right),$$

where a(x,y) denotes a metric value, x denotes a level of a transmission signal, y denotes an output level of an ADC, $y_n$ denotes an n-th output level of an ADC, $x_m$ denotes an m-th level of a transmission signal, and $K_m$ and $\sigma_m$ denote given constants that may be changed depending on m.

Conversely, the difference between the level of a received signal outputted from a relatively low-resolution ADC, and the level of the analog signal actually received, may be increased due to the low-resolution of the ADC.

Because soft decision values calculated according to Equation 1 may be different from actual soft decision values generated based on the LLR when a low-resolution ADC is used, an ECC calculation using the soft decision values may have an error correction capability less than an ECC calculation using the actual soft decision values.

SUMMARY

According to an example embodiment, a method of generating a soft decision value using an Analog-to-Digital Converter (ADC) having a given resolution may include receiving metric values calculated based on levels of a transmission signal and output levels of the ADC. Metric values corresponding to a level of a received signal may be selected from among the received metric values. A first maximum metric value may be detected from among the selected metric values when a transmission bit is a first level, and a second maximum metric value may be detected from among the selected metric values when the transmission bit is a second level. The soft decision value may be generated based on a difference between the first maximum metric value and the second maximum metric value.

The method of generating a soft decision value using an ADC having a given resolution may be implemented using a program stored on a computer-readable recording medium, for example.

According to another example embodiment, an apparatus for generating a soft decision value may include a receiving unit, a selection unit, a detection unit, and/or a soft decision value generation unit. The receiving unit may receive metric values calculated based on levels of a transmission signal and output levels of an ADC having a given resolution. The selection unit may select metric values corresponding to a level of a received signal from among the received metric values. The detection unit may detect, from among the selected metric values, a first maximum metric value when a transmission bit is a first level, and a second maximum metric value when the transmission bit is a second level. The soft decision value generation unit may generate the soft decision value based on a difference between the first maximum metric value and the second maximum metric value.

BRIEF DESCRIPTION OF THE DRAWINGS

The above and other features and advantages of example embodiments will become more apparent by describing in detail example embodiments with reference to the attached drawings. The accompanying drawings are intended to depict example embodiments and should not be interpreted to limit the intended scope of the claims. The accompanying drawings are not to be considered as drawn to scale unless explicitly noted.

DETAILED DESCRIPTION OF EXAMPLE EMBODIMENTS

Figure 1:
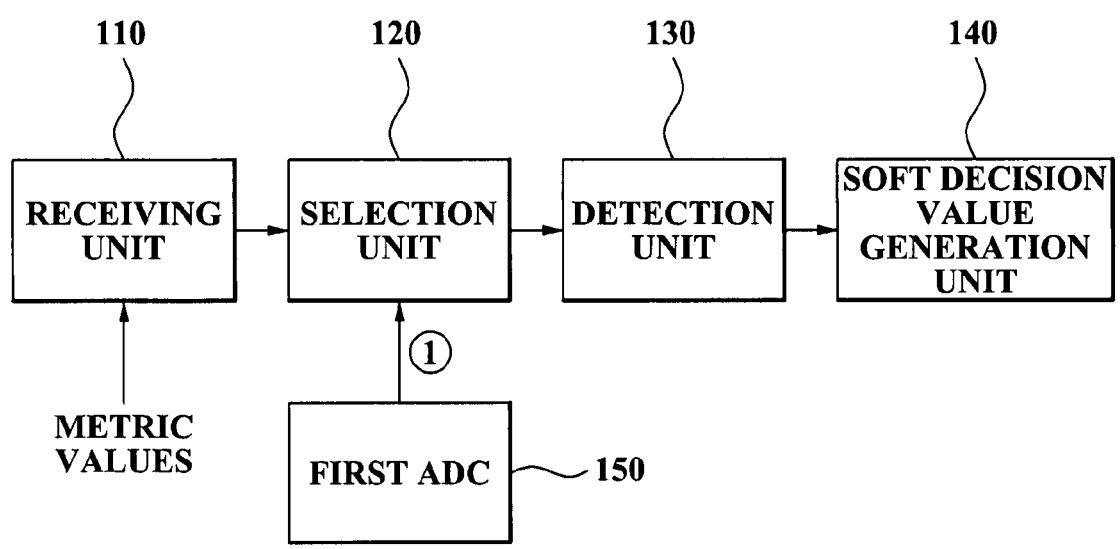
FIG. 1 is a block diagram illustrating an apparatus for generating a soft decision value according to an example embodiment.

Detailed example embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

FIG. 1 is a block diagram illustrating an apparatus for generating a soft decision value according to an example embodiment.

Referring to FIG. 1, an apparatus for generating the soft decision value may include a receiving unit 110, a selection unit 120, a detection unit 130, a soft decision value generation unit 140, and/or a first Analog-to-Digital Converter (ADC) 150.

The receiving unit 110 may receive metric values calculated based on levels of a transmission signal and output levels of an ADC having a given resolution. The number of output levels of the ADC may depend on the resolution of the ADC. The resolution of the ADC used in calculating the metric values may also be changed, and may be greater than or equal to the resolution of the first ADC 150 included in the apparatus for generating the soft decision value.

For example, the ADC may be a relatively low-resolution ADC, in which the number of output levels of the ADC is less than a given value that is based on the number of levels of the transmission signal, and may have an arbitrary ADC output level.

Here, the relatively low-resolution ADC may be an ADC in accordance with Equation 2:

Number of output levels of ADC/(number of levels of transmission signal−1)<8     [Equation 2]

As described in Equation 2, the relatively low-resolution ADC may be changed depending on the number of levels of the transmission signal.

For example, the relatively low-resolution ADC may be an ADC between 1 and 6 bits when a modulation method of the transmission signal is 16 Pulse Amplitude Modulation (PAM).

As another example, the relatively low-resolution ADC may be an ADC between 1 and 4 bits when a modulation method of the transmission signal is Quadrature Phase Shift Keying (QPSK).

As a further example, the low-resolution ADC may be any one of a 1-bit ADC and a 2-bit ADC when a modulation method of the transmission signal is Binary Phase Shift Keying (BPSK).

For the above examples, the metric values may be calculated by using the levels of the transmission signal for each bit of the transmission signal, and the output levels of the ADC may depend on the modulation method of the transmission signal.

The receiving unit 110 may receive the metric values from a storage device in which the calculated metric values are stored, for example. Here, a storage area of the storage device may be changed depending on the modulation method of the transmission signal, the number of output levels of the ADC, and the number of levels of the transmission signal.

The receiving unit 110 may receive the metric values from a logic circuit which receives the levels of the transmission signal and the output levels of the ADC, and outputs the calculated metric values.

The receiving unit 110 may receive the metric values from an external storage device in which the calculated metric values are stored, for example.

Here, when a metric value is assumed by using a Gaussian Probability Distribution Function (PDF), the metric value may be calculated according to Equation 3:

$$a(x, y) = \log p(y \mid x) \quad \text{[Equation 3]}$$

$$p(y = y_n \mid x = x_m) = K_m \int_{y_n^{(1)}}^{y_n^{(2)}} \exp\left(-\frac{(y - x_m)^2}{\sigma_m^2}\right) dy,$$

where a(x,y) denotes a metric value, x denotes a level of a transmission signal, y denotes an output level of an ADC, $y_n$ denotes an n-th output level of an ADC, $x_m$ denotes an m-th level of a transmission signal, $y_n^{(1)}$ denotes a given lower level of an n-th output level of an ADC, $y_n^{(2)}$ denotes a given upper level of an n-th output level of an ADC, and $K_m$ and $\sigma_m$ denote given constants.

The receiving unit 110 may receive the metric values in which an addition calculation is performed for each given metric value from among the calculated metric values.

The first ADC 150 may receive an analog received signal, and output to the selection unit 120 a level of the received signal ①, which may be a digital signal converted from the received analog signal.

The level of the received signal may be any one of the output levels of the ADC used for calculating the metric values.

Here, a resolution of the first ADC 150, and a resolution of the ADC used for calculating the metric values may be equal or different.

The selection unit 120 may select metric values corresponding to the level of the received signal ① received from the first ADC 150 from among the metric values received by the receiving unit 110. The selection unit 120 may output the metric values for each bit of the received signal from among the metric values.

The received signal may be a signal received from a channel, such as a communication channel, a storage channel, or the like. For example, the channel may be a wireless section, a hard disk (HD), a Compact Disk (CD), a Digital Video Disk (DVD), a memory, or the like. Also, the channel of the apparatus for generating the soft decision value according to an example embodiment may be the memory, which may include a memory of a Single Level Cell (SLC) method and a memory of a Multi-Level Cell (MLC) method.

The detection unit 130 may detect, from among the metric values selected by the selection unit 120, a first maximum metric value when a transmission bit is a first level, for example, 1, and a second maximum metric value when the transmission bit is a second level, for example, 0.

Here, the detection unit 130 may detect, from among the metric values selected for each bit of the received signal, the first maximum metric value when the transmission bit is the first level, and the second maximum metric value when the transmission bit is the second level.

The soft decision value generation unit 140 may generate the soft decision value based on a difference between the first maximum metric value and the second maximum metric value. For example, the soft decision value generation unit 140 may generate the soft decision value by using Equation 4:

$$\tilde{b} \approx \max_{x:\, b=1} a(x, y) - \max_{x:\, b=0} a(x, y), \qquad \text{[Equation 4]}$$

where $\tilde{b}$ denotes a soft decision value, x:b=1 denotes that a transmission bit is 1, and x:b=0 denotes that a transmission bit is 0.

As illustrated by Equation 4, the soft decision value may be generated by using the difference between the first maximum metric value when the transmission bit is 1, and the second maximum metric value when the transmission bit is 0, from among the metric values corresponding to the level of the received signal.

Figure 2:
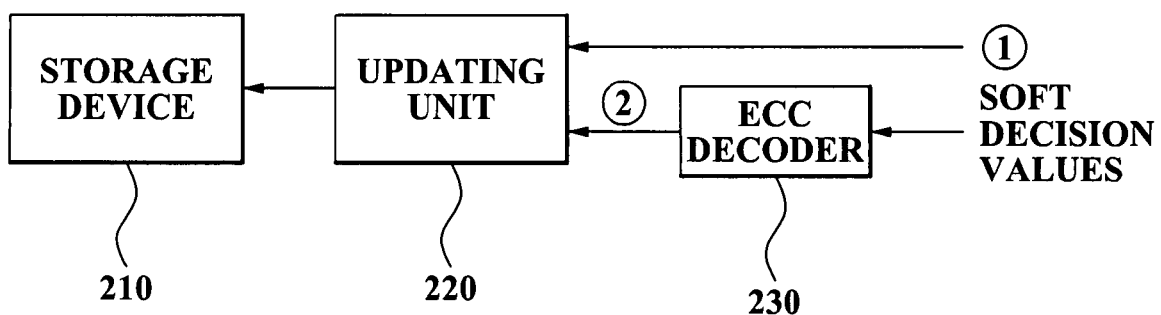
FIG. 2 is a diagram illustrating an additional configuration of an apparatus for generating a soft decision value according to an example embodiment.

FIG. 2 is a diagram illustrating an example configuration of an apparatus for generating a soft decision values according to an example embodiment. FIG. 2 illustrates an additional configuration of an apparatus for providing metric values to a receiving unit.

Referring to FIG. 2, the additional configuration of an apparatus for providing the metric values may include a storage device 210 and an updating unit 220.

The storage device 210 may store the metric values calculated by using levels of a transmission signal and output levels of an ADC.

The updating unit 220 may update the metric values stored in the storage device 210 based on a level of a received signal ① and a level of a transmission signal ②.

Here, the level of the received signal ① may be a level of a signal outputted from the first ADC 150 of FIG. 1. Also, the level of the transmission signal ② may be any one of the levels of the transmission signal generated based on soft decision values from the soft decision value generation unit 140. The level of the transmission signal ② may be generated by decoding the soft decision values using either an Error Control Code (ECC) decoder 230 or an Error Correction Code (ECC) decoder 230. For example, when a modulation method of the transmission signal is 16 PAM, the ECC decoder 230 may receive and decode four soft decision values for the level of the received signal outputted from the soft decision value generation unit 140, and output to the updating unit 220 any one of the levels of the transmission signal of 16 PAM for the 4 bits outputted by ECC decoding. Also, the level of the transmission signal outputted to the updating unit 220 may be any one of the levels of the transmission signal used for calculating the metric values.

The updating unit 220 may calculate metric values for updating a given number of levels of the received signal, and may update the calculated metric values in the storage device 210. Here, the updating unit 220 may update, in the storage device 210, the metric values for updating for the given number of levels of the received signal, calculate the metric values for updating each time the level of the received signal is received, and update the metric values for updating in the storage device 210.

The metric values updated in the storage device 210 may be provided to the receiving unit 110.

The updating unit 220 may be provided with the storage device 210 storing the metric values for updating. For example, the updating unit 220 may store, in the storage device 210, the metric values for updating corresponding to the given number of levels of the received signal, and update in the storage device 210 the metric values for updating stored in the storage device 210. Here, the metric values updated in the storage device 210 may be metric values corresponding to the metric values for updating from among the metric values stored in the storage device 210.

Figure 3:
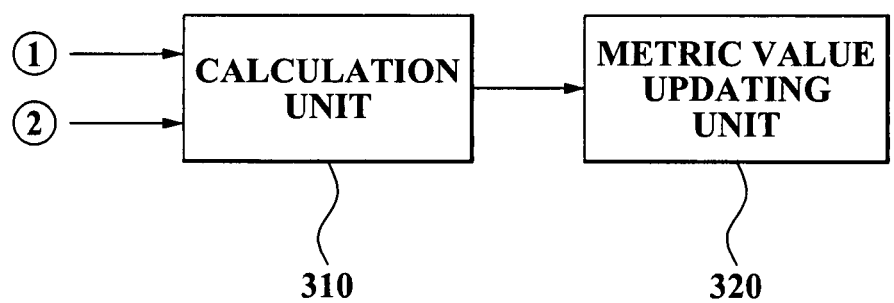
FIG. 3 is a diagram illustrating the updating unit of FIG. 2 in more detail.

FIG. 3 is an example diagram illustrating the updating unit 220 of FIG. 2 in more detail.

Referring to FIG. 3, the updating unit 220 may include a calculation unit 310 and a metric value updating unit 320.

The calculation unit 310 may calculate metric values for updating based on the generated level of the transmission signal ② outputted from the ECC decoder 230, and the level of the received signal ① outputted from the first ADC 150.

For example, the calculation unit 310 may calculate the metric values for updating based on the level of the received signal ① and the level of the transmission signal ② generated by performing an ECC decoding of soft decision values.

The metric value updating unit 320 may store, in the storage device 210, the metric values for updating calculated by the calculation unit 310.

Also, the metric values for updating stored in the storage device 210 may be provided to the receiving unit 110.

Figure 4:
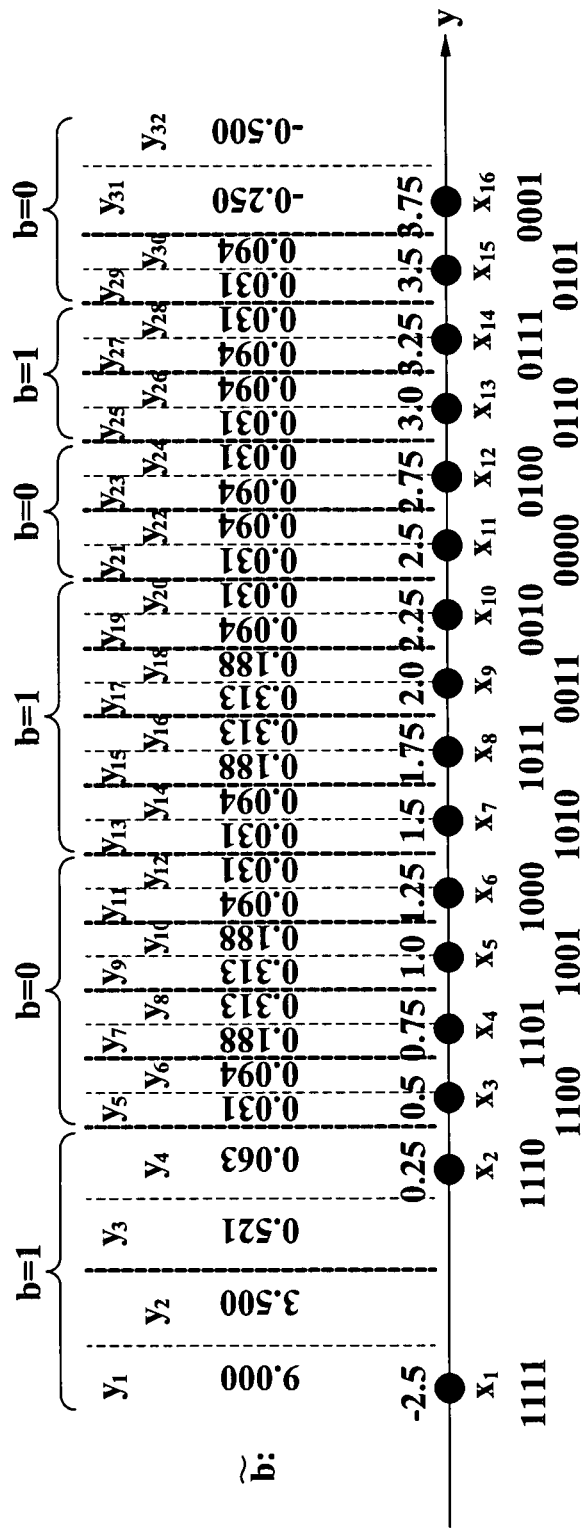
FIG. 4 is a diagram illustrating generation of a soft decision value according to an example embodiment.

FIG. 4 is an example diagram illustrating generation of a soft decision value according to an example embodiment.

FIG. 4 illustrates a third bit of four transmission bits when a modulation method of a transmission signal is 16 PAM.

As shown in FIG. 4, levels of a transmission signal may be between x1 and x16. Levels of a received signal or output levels of an ADC may be between y1 and y32. For example, the metric values received by the receiving unit 110 may be metric values for (x1, y1), (x1, y2), . . . , (x16, y31), and (x16, y32).

Here, because the number output levels of the ADC is 32, an analog received signal may be converted into a digital received signal, and the ADC outputting the level of the received signal may be a 5-bit ADC, for example.

When the level of the received signal is inputted, the apparatus for generating the soft decision value according to an example embodiment may select metric values corresponding to the level of the received signal which is inputted. For example, when the level of the received signal is y3, the metric values corresponding to y3, that is, (x1, y3), (x2, y3), . . . , and (x16, y3) may be outputted, and a first maximum metric value when a transmission bit b is 1, and a second maximum metric value when the transmission bit b is 0 may be detected from among the outputted metric values.

A difference between the first maximum metric value when the transmission bit b is 1, and the second maximum metric value when the transmission bit b is 0 may be outputted to a soft decision value $\tilde{b}$.

Figure 5:
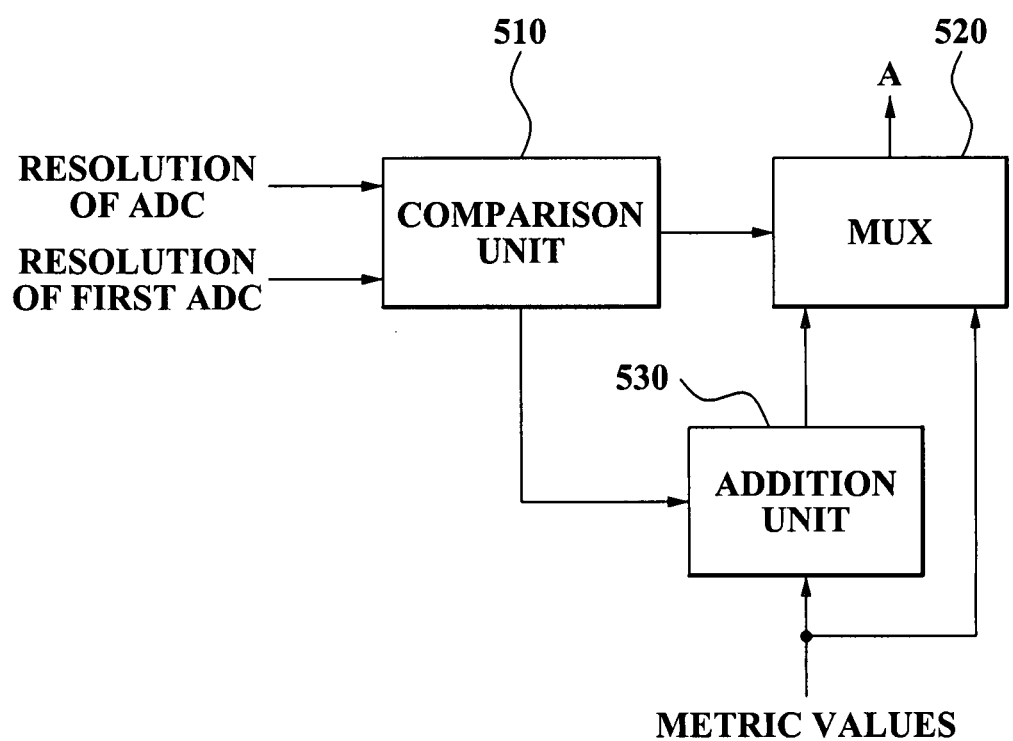
FIG. 5 is a diagram illustrating another additional configuration of an apparatus for generating a soft decision value according to an example embodiment.

FIG. 5 is an example diagram illustrating another additional configuration of an apparatus for generating a soft decision value according to an example embodiment.

FIG. 5 illustrates a compensation for the difference between a resolution of an ADC used for calculating metric values, and a resolution of the first ADC 150 of FIG. 1 outputting the level of the received signal.

Referring to FIG. 5, the apparatus for generating the soft decision value may further include a comparison unit 510, a multiplexer (MUX) 520, and an addition unit 530.

The comparison unit 510 may compare the resolution of the ADC and the resolution of the first ADC. The comparison unit 510 may output a control signal to indicate whether to use metric values calculated by using levels of a transmission signal and output levels of the ADC as they are, or whether to use metric values in which an addition calculation is performed, by comparing resolutions between the ADC and the first ADC.

The addition unit 530 may receive the metric values calculated by using the levels of the transmission signal and the output levels of the ADC, for example, either metric values stored in a storage device or metric values outputted from a logic circuit, and may perform the addition calculation of the received metric values, based on the control signal outputted from the comparison unit 510.

For example, when the addition unit 530 receives, from the comparison unit 510, a control signal indicating to perform the addition calculation of two metric values, the addition unit 530 may perform the addition calculation for each of the two given metric values from among the received metric values, and may output, to the MUX 520, the metric values in which the addition calculation is performed. Referring to FIGS. 4 and 5, the addition unit 530 may output, to the MUX 520, the metric values created by adding the two original metric values, such as an addition of two metric values (x1, y1) and (x1, y2), and an addition of two metric values (x1, y3) and (x1, y4).

The addition unit 530 may be configured to perform an addition calculation of a number of metric values corresponding to the control signal, based on the control signal outputted from the comparison unit 510, and to output the metric values in which the addition calculation is performed. The addition unit 530 may perform the addition calculation of two metric values according to the control signal, and perform the addition calculation of four metric values according to another control signal. For example, when there is a 2-bit difference between the resolution of the ADC and the resolution of the first ADC, such as when the ADC used for calculating the metric values is a 6-bit ADC, and the first ADC 150 is a 4-bit ADC, the addition unit 530 may receive, from the comparison unit 510, the control signal for the 2-bit difference, perform the addition calculation of four metric values corresponding to the control signal, and output the metric values in which the addition calculation is performed.

The addition unit 530 of FIG. 5 may be configured to receive the control signal from the comparison unit 510. However, the addition unit 530 may alternatively be configured to receive the metric values without receiving the control signal from the comparison unit 510, and to perform the addition calculation of the given number of metric values.

The MUX 520 may output any one A of the metric values stored in the storage device, or outputted from the logic circuit, and the metric values in which the addition calculation is performed, the metric values being outputted from the addition unit 530, based on the control signal outputted from the comparison unit 510, and may provide the any one A to the receiving unit 110.

For example, when the resolution of the first ADC and the resolution of the ADC are equal, the MUX 520 may output the metric values stored in the storage device 210 or outputted from the logic circuit. When the resolution of the first ADC and the resolution of the ADC are different, the MUX 520 may output the metric values in which the addition calculation is performed.

When the addition unit 530 is configured to output the received metric values, or to output the metric values in which the addition calculation is performed, based on the control signal outputted from the comparison unit 510, the MUX may be unnecessary and may be replaced with a direct connection.

Figure 6:
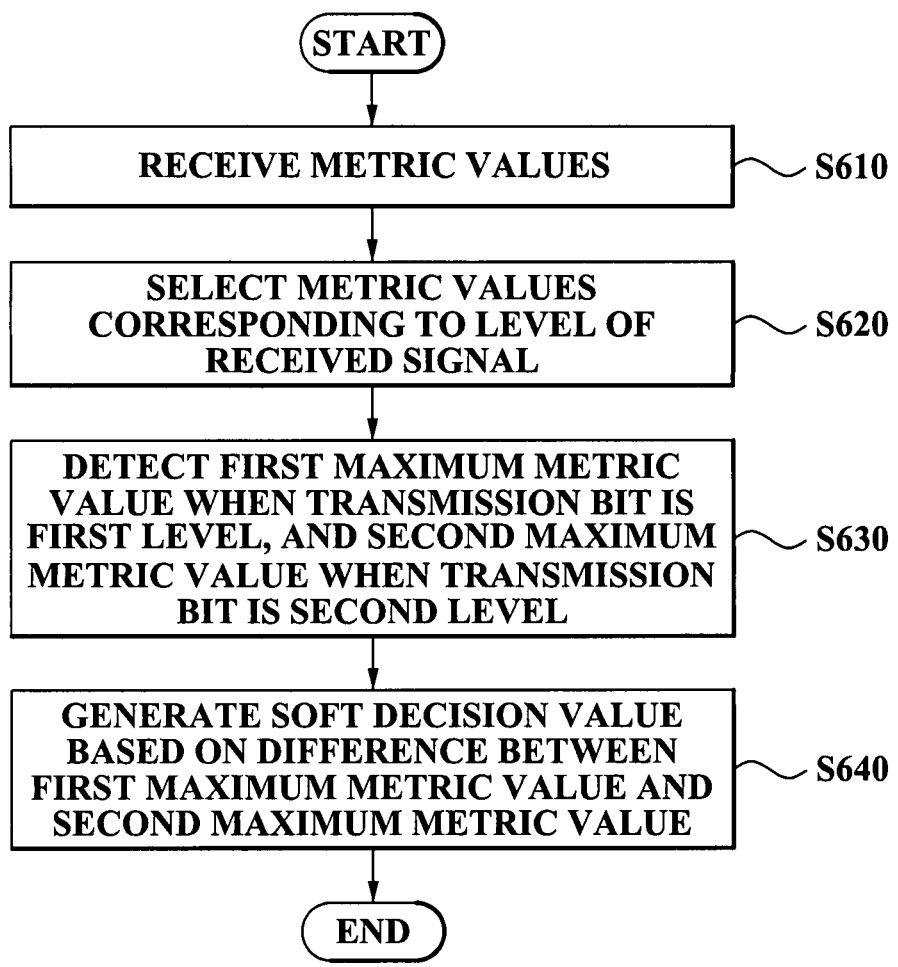
FIG. 6 is a flowchart illustrating a method of generating a soft decision value according to an exemplary embodiment of the present invention.

FIG. 6 is a flowchart illustrating a method of generating a soft decision value according to an example embodiment.

Referring to FIG. 6, the method of generating the soft decision value may include receiving calculated metric values (S610).

In this example, the metric values may be received from a storage device storing the metric values calculated by using levels of a transmission signal and output levels of an ADC.

The metric values may be received from a logic circuit calculating the metric values by using the levels of the transmission signal and the output levels of the ADC, where the logic circuit also outputs the calculated metric values.

The metric values may be received from an external storage device in which the calculated metric values are stored, for example.

The ADC may be a relatively low-resolution ADC in which the number output levels of the ADC may less than a given value based on the number of levels of the transmission signal. The relatively low-resolution ADC may be an ADC in accordance with the above-described Equation 2.

Accordingly, the relatively low-resolution ADC may be changed depending on the number of levels of the transmission signal. For example, the relatively low-resolution ADC may be an ADC between 1 and 6 bits when a modulation method of the transmission signal is 16 PAM.

As another example, the low-resolution ADC may be an ADC between 1 and 4 bits when a modulation method of the transmission signal is QPSK.

As still another example, the low-resolution ADC may be any one of a 1-bit ADC and a 2-bit ADC when a modulation method of the transmission signal is BPSK.

Here, the metric values may be calculated by the above-described Equation 3.

When the metric values are received, metric values corresponding to a level of a received signal may be selected from among the received metric values (S620).

The level of the received signal may be any one of the output levels of the ADC used for calculating the metric values.

The received signal may be a signal received from a channel, and the channel may be a communication channel, a storage channel, or the like. Examples of the channel may include a wireless section, an HD, a CD, a DVD, a memory, and the like. Also, the channel of the method of generating the soft decision value according to an example embodiment may be the memory.

For example, the memory may include a memory of an SLC method and a memory of an MLC method.

When the metric values corresponding to the level of the received signal are selected, a first maximum metric value when a transmission bit is a first level, and a second maximum metric value when the transmission bit is a second level may be detected from among the selected metric values (S630).

The first level may denote a bit value of 1, and the second level may denote a bit value of 0, for example, or vice-versa.

The soft decision value may be generated based on the difference between the first maximum metric value when the detected transmission bit is the first level, and the second maximum metric value when the detected transmission bit is the second level (S640).

For example, the soft decision value may be generated by the above-described Equation 4.

Figure 7:
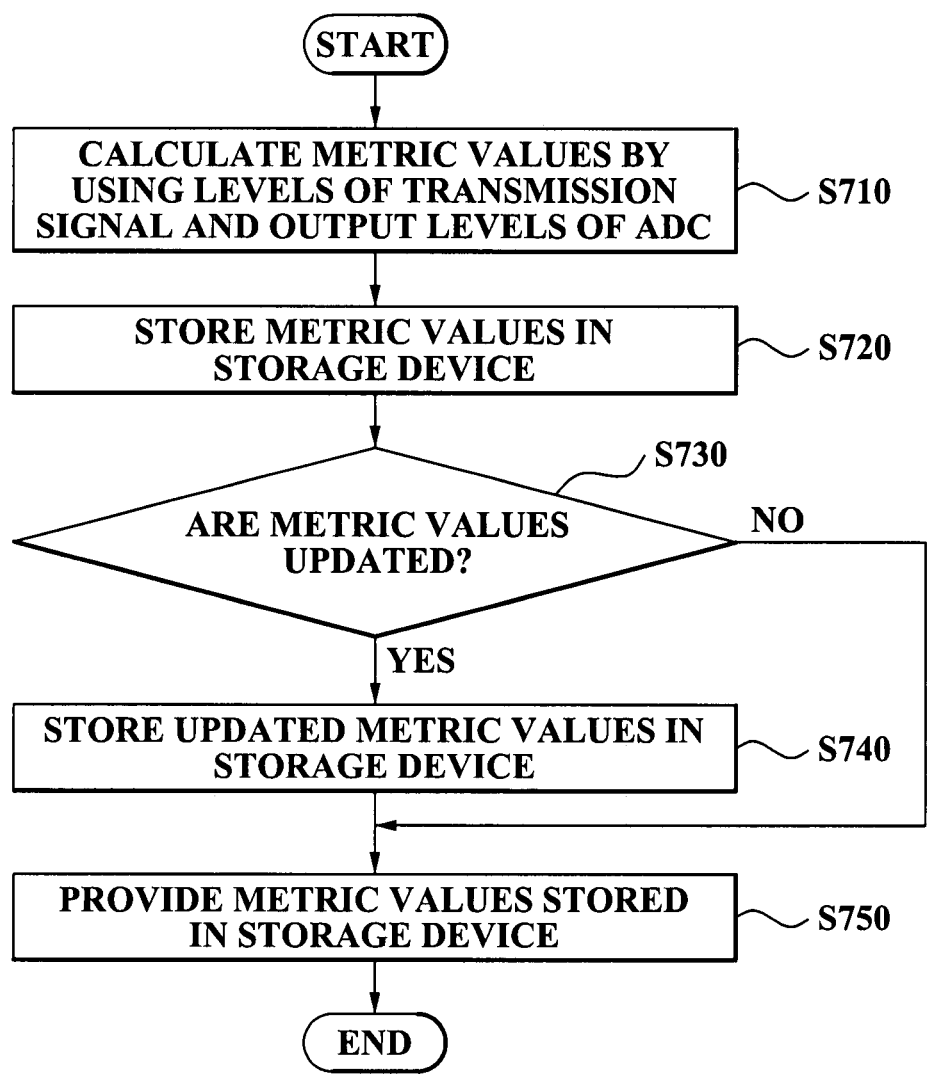
FIG. 7 is a flowchart illustrating a process of generating metric values in a method of generating a soft decision value according to an exemplary embodiment of the present invention.

FIG. 7 is a flowchart illustrating a process of generating metric values in a method of generating a soft decision value according to an example embodiment.

Referring to FIG. 7, metric values may be calculated using levels of a transmission signal and output levels of an ADC in order to provide the metric values (S710).

The calculated metric values may be stored in a storage device (S720), for example.

Whether the metric values stored in the storage device are updated may be determined (S730). When it is determined that the metric values are not updated, the metric values calculated by using the levels of the transmission signal and the output levels of the ADC may be provided from the storage device (S750).

When it is determined that the metric values are updated, the updated metric values may be stored in the storage device (S740), and the updated metric values stored in the storage device may be provided in operation S750.

The updated metric values may be calculated by using the level of the received signal and the level of the transmission signal.

Here, the level of the transmission signal may be any one of the levels of the transmission signal generated based on soft decision values for the level of the received signal. For example, when a modulation method of the transmission signal is 16 PAM, the level of the transmission signal may be a level for 4 bits generated by performing an ECC decoding of four soft decision values, and may be any one of 16 levels.

A process of storing the updated metric values in the storage device may be performed after receiving a given number of levels of the received signal. For example, metric values for updating corresponding to the given number of levels of the received signal may be calculated, and the calculated metric values for updating may be updated in the storage device.

The process of storing the updated metric values in the storage device may calculate the metric values for updating each time the level of the received signal is received, and update the calculated metric values for updating in the storage device.

Figure 8:
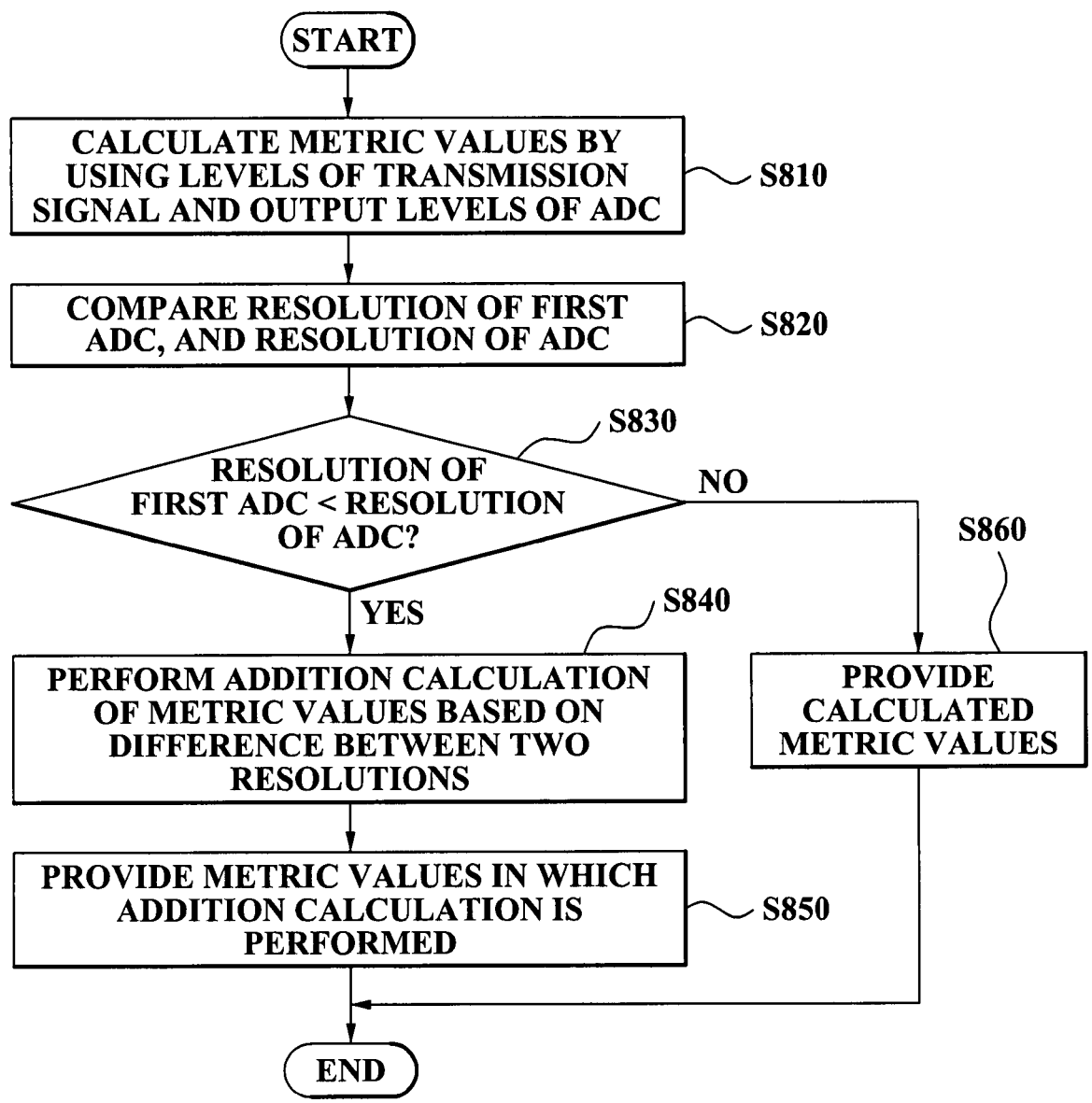
FIG. 8 is a flowchart illustrating another process of generating metric values in a method of generating a soft decision value according to an exemplary embodiment of the present invention.

FIG. 8 is a flowchart illustrating a process of generating metric values in a method of generating a soft decision value according to an example embodiment.

The example method described with reference to FIG. 8 may be used to correct for differences between the resolution of an ADC used for calculating metric values and the resolution of a first ADC outputting a level of a received signal.

Referring to FIG. 8, metric values may be calculated by using levels of a transmission signal and output levels of the ADC (S810).

The calculated metric values may be stored in a storage device, for example.

The metric values may be acquired from a logic circuit receiving the levels of the transmission signal and the output levels of the ADC, and outputting the calculated metric values.

The resolution of the first ADC and the resolution of the ADC may be compared to determine whether to provide the calculated metric values (S820).

Whether the resolution of the first ADC is less than the resolution of the ADC may be determined (S830). When the resolution of the first ADC is not less than the resolution of the ADC, the calculated metric values may be provided (S860).

Conversely, when it is determined that the resolution of the first ADC is less than the resolution of the ADC (S830), an addition calculation of the metric calculated values may be performed based on a difference between the resolution of the first ADC and the resolution of the ADC (S840). The metric values in which the addition calculation is performed may then be provided (S850).

Example embodiments having thus been described, it will be obvious that the same may be varied in many ways. For example, the methods according to example embodiments may be implemented in hardware and/or software. The hardware/software implementations may include a combination of processor(s) and article(s) of manufacture. The article(s) of manufacture may further include storage media and executable computer program(s), for example, a computer program product stored on a computer readable medium.

The executable computer program(s) may include the instructions to perform the described operations or functions. The computer executable program(s) may also be provided as part of externally supplied propagated signal(s). Such variations are not to be regarded as a departure from the intended spirit and scope of example embodiments, and all such modifications as would be obvious to one skilled in the art are intended to be included within the scope of the following claims.

What is claimed is:

1. A method of generating a soft decision value using an Analog-to-Digital Converter (ADC) having a given resolution, the method comprising:
receiving metric values calculated based on levels of a transmission signal and output levels of the ADC;
selecting metric values corresponding to a level of a received signal from among the received metric values;
detecting, from among the selected metric values, a first maximum metric value when a transmission bit is a first level, and a second maximum metric value when the transmission bit is a second level; and
generating the soft decision value based on a difference between the first maximum metric value and the second maximum metric value, said generating the soft decision value including calculating the difference between the first maximum metric value and the second maximum metric value,
wherein the ADC is a relatively low-resolution ADC in which the number of output levels is less than a desired value derived from the number of levels of the transmission signal, and
the ADC is one of i) an ADC between 1 and 6 bits when a modulation method of the transmission signal is 16 Pulse Amplitude Modulation (PAM), ii) an ADC between 1 and 4 bits when the modulation method of the transmission signal is Quadrature Phase Shift Keying (QPSK), iii) a 1-bit ADC when the modulation method of the transmission signal is Binary Phase Shift Keying (BPSK), and iv) a 2-bit ADC when the modulation method of the transmission signal is Binary Phase Shift Keying (BPSK).

2. A method of generating a soft decision value using an Analog-to-Digital Converter (ADC) having a given resolution, the method comprising:

receiving metric values calculated based on levels of a transmission signal and output levels of the ADC;

selecting metric values corresponding to a level of a received signal from among the received metric values;

detecting, from among the selected metric values, a first maximum metric value when a transmission bit is a first level, and a second maximum metric value when the transmission bit is a second level;

generating the soft decision value based on a difference between the first maximum metric value and the second maximum metric value, said generating the soft decision value including calculating the difference between the first maximum metric value and the second maximum metric value; and updating the metric values stored in a storage device, wherein the metric values are received from the storage device in which calculated metric values are stored, and updating the metric values includes generating at least one of the levels of the transmission signal from soft decision values corresponding to the level of the received signal, calculating updated metric values based on the generated level of the transmission signal and the level of the received signal, and updating the metric values stored in the storage device with the updated metric values.

3. The method of claim 1, wherein updating the metric values further includes calculating the updated metric values for a desired number of levels of the received signal and substituting the metric values stored in the storage device with the updated metric values.

4. The method of claim 1, wherein each level of the transmission signal is generated by performing an Error Control Code (ECC) decoding of the soft decision values corresponding to the level of the received signal.

5. A method of generating a soft decision value using an Analog-to-Digital Converter (ADC) having a given resolution, the method comprising:

receiving metric values calculated based on levels of a transmission signal and output levels of the ADC;

selecting metric values corresponding to a level of a received signal from among the received metric values;

detecting, from among the selected metric values, a first maximum metric value when a transmission bit is a first level, and a second maximum metric value when the transmission bit is a second level;

generating the soft decision value based on a difference between the first maximum metric value and the second maximum metric value, said generating the soft decision value including calculating the difference between the first maximum metric value and the second maximum metric value;

comparing a resolution of a first ADC outputting the level of the received signal and a resolution of the ADC; and performing an addition calculation for each metric value based on a difference between the resolution of the first ADC and the resolution of the ADC when the resolution of the first ADC is less than the resolution of the ADC, wherein receiving the metric values includes receiving the metric values in which the addition calculation is performed.

6. An apparatus for generating a soft decision value, the apparatus comprising:

a receiving unit configured to receive metric values calculated based on levels of a transmission signal and output levels of an ADC having a given resolution;

a selection unit configured to select metric values corresponding to a level of a received signal from among the received metric values;

a detection unit configured to detect, from among the selected metric values, a first maximum metric value when a transmission bit is a first level, and a second maximum metric value when the transmission bit is a second level; and a soft decision value generation unit configured to generate the soft decision value based on a difference between the first maximum metric value and the second maximum metric value, the soft decision value generation unit configured to calculate the difference between the first maximum metric value and the second maximum metric value, wherein the ADC is a relatively low-resolution ADC in which the number of output levels is less than a desired value derived from the number of levels of the transmission signal, and the ADC is one of i) an ADC between 1 and 6 bits when a modulation method of the transmission signal is 16 PAM, ii) an ADC between 1 and 4 bits when the modulation method of the transmission signal is QPSK, iii) a 1-bit ADC when the modulation method of the transmission signal is BPSK, and iv) a 2-bit ADC when the modulation method of the transmission signal is BPSK.

7. An apparatus for generating a soft decision value, the apparatus comprising:

a receiving unit configured to receive metric values calculated based on levels of a transmission signal and output levels of an ADC having a given resolution;

a selection unit configured to select metric values corresponding to a level of a received signal from among the received metric values;

a detection unit configured to detect, from among the selected metric values, a first maximum metric value when a transmission bit is a first level, and a second maximum metric value when the transmission bit is a second level;

a soft decision value generation unit configured to generate the soft decision value based on a difference between the first maximum metric value and the second maximum metric value, the soft decision value generation unit configured to calculate the difference between the first maximum metric value and the second maximum metric value, and an updating unit configured to update the metric values stored in a storage device, wherein the receiving unit is configured to receive the metric values from the storage device in which the calculated metric values are stored, and the updating unit includes, a calculation unit configured to generate at least one of the levels of the transmission signal from soft decision values corresponding to the level of the received signal generated by the soft decision value generation unit, and calculate updated metric values based on the generated level of the transmission signal and the level of the received signal; and a metric value updating unit configured to update the metric values stored in the storage device with the updated metric values.

8. The apparatus of claim 7, wherein the calculation unit is configured to calculate the updated metric values for a desired number of levels of the received signal, and the metric value updating unit is configured to substitute the metric values stored in the storage device with the updated metric values.

9. The apparatus of claim 7, wherein each level of the transmission signal is generated by performing an ECC decoding of the soft decision values corresponding to the level of the received signal.

10. An apparatus for generating a soft decision value, the apparatus comprising:
- a receiving unit configured to receive metric values calculated based on levels of a transmission signal and output levels of an ADC having a given resolution;
- a selection unit configured to select metric values corresponding to a level of a received signal from among the received metric values;
- a detection unit configured to detect, from among the selected metric values, a first maximum metric value when a transmission bit is a first level, and a second maximum metric value when the transmission bit is a second level;
- a soft decision value generation unit configured to generate the soft decision value based on a difference between the first maximum metric value and the second maximum metric value, the soft decision value generation unit configured to calculate the difference between the first maximum metric value and the second maximum metric value;
- a comparison unit configured to compare a resolution of a first ADC outputting the level of the received signal and a resolution of the ADC; and
- an addition unit configured to perform an addition calculation for each metric value based on a difference between the resolution of the first ADC and the resolution of the ADC when the resolution of the first ADC is less than the resolution of the ADC,
- wherein the receiving unit receives the metric values in which the addition calculation outputted from the addition unit is performed.

* * * * *